United States Patent
Ramachandran et al.

(10) Patent No.: US 6,950,201 B2
(45) Date of Patent: Sep. 27, 2005

(54) GENERATING IMAGES QUICKLY IN RASTER IMAGE PROCESSING

(75) Inventors: Srinivasan Ramachandran, Karnataka (IN); Praveen Kademada Ganapathy, Karnataka (IN); Vivek Kumar Thakur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 931 days.

(21) Appl. No.: 09/783,889

(22) Filed: Feb. 14, 2001

(65) Prior Publication Data

US 2002/0109853 A1 Aug. 15, 2002

(51) Int. Cl.[7] .......................... G06F 3/12; G06F 13/00
(52) U.S. Cl. ...................... 358/1.13; 358/1.9; 358/2.1
(58) Field of Search ............................... 358/1.1–1.18, 358/2.1, 2.99, 3.01, 3.07

(56) References Cited

U.S. PATENT DOCUMENTS 6,437,872 B1 * 8/2002 Davidson et al. .......... 358/1.15

\* cited by examiner

*Primary Examiner*—Douglas Tran
(74) *Attorney, Agent, or Firm*—Robert D. Marshall, Jr.; W. James Brady, III; Frederick J. Telecky, Jr.

(57) ABSTRACT

A raster image processing system which supports multiple rendering/screening approaches, and selects an optimal approach suited for the specific images to be generated. In an embodiment, images may be rendered using either back-end screening approach or pipelined screening approach. Several variables may be measured to determine which one of the two consumes minimal time for a specific image to be rendered, and the approach consuming minimal time is selected. Typically, back-end screening is selected when multiple overlapping objects are present, and pipelined screening is selected otherwise.

40 Claims, 3 Drawing Sheets

FIG. 5

GENERATING IMAGES QUICKLY IN RASTER IMAGE PROCESSING

BACKGROUND OF THE INVENTION

1. Field of the Invention

The present invention relates to raster image processing, and more specifically to a method and apparatus for generating images quickly based on the information specified by conventions such as page description language (PDL).

2. Related Art

Raster image processing generally refers to processing data representing several objects (e.g., fonts, images or trapezoids) to generate an image ("target image") for reproduction on an output device. The target image is typically generated in the form of a bit map. The bit map is then used to reproduce the image on output devices such as printers.

The details of objects (object models) and the specific manner in which the objects are to be displayed are represented according to various conventions (e.g., page description language) as is well known in the relevant arts. Thus, the representation is examined to determine the specific objects to be included in the raster data to be finally sent to an output device, and the corresponding task is commonly referred to as interpretation.

Based on the output of interpretation, the data representing each object is processed to generate the image (e.g., bit map of a page) specified by the page description language. The corresponding processing may be referred to as 'rendering' of the image. The output data generated by rendering is usually device independent and the data is processed ("screening") further to generate the image in a format (e.g., in tonal levels supported by the output device) which can be reproduced by a corresponding output device.

The tasks of rendering and/or screening typically require extensive data transfers and/or processing. As a result, the rate at which images are generated may be determined by the efficiency of the rendering task and/or screening task.

Many times generating the rasterized image is the bottleneck in the overall process of reproducing an image. The bottleneck is particularly noticeable, for example, when high resolution color images are rasterized for printing on color printers, even when mechanical (i.e., internal to printers) components are not felt to be the bottleneck. Accordingly, there has been recognized a need to increase the throughput performance of the rendering task.

In one prior approach known as back-end screening, the output of the rendering task ("map") is stored in a contone buffer. A screening task then retrieves the data in the contone buffer and generates the image in a suitable format for sending to the output device.

In another approach known as integrated screening, the contone buffer may be eliminated and a pipeline (usually via a memory) may be setup between the rendering task and the screening task. The throughput performance of the overall raster image processing may be enhanced due to the use of the pipeline.

However, the throughput performance of pipeline screening approach may be worse than that of the back-end screening in some circumstances, particularly when the same pixel of a target image is painted multiple times. Such a need to paint multiple times may occur, for example, when a page description language contains multiple overlapping objects and each object is rendered independently as is well known in the relevant arts.

While the above description is provided with reference to back-end screening and pipeline screening, it should be understood that any specific approach may perform better (than another approach) in some situations and worse in some others. Accordingly, what is needed is a method and apparatus which renders images efficiently such that the images can be generated at a high rate.

SUMMARY OF THE INVENTION

In accordance with the present invention, a system (e.g., computer system) is implemented to generate images using one of several approaches. For each approach tasks such as rendering and screening may differ. The resources required for each of the approaches is measured and a suitable approach is determined based on the measurement. A different approach may be used potentially for a different band of the target image.

In one embodiment, two approaches (back-end screening and integrated screening) are implemented within a computer system, and the approach determined to be consuming least clock cycles is chosen to generate an image for each page. Thus, integrated screening, which typically generates images at a higher rate, is usually used. However, the back-end screening may be used when the integrated screening can be inefficient, for example, when there is substantial overlap in the objects to be rendered.

According to another aspect of the present invention, measurement as to number of clock cycles is based on the number of potential cache misses, the inadequacy of cache to hold required data (e.g., a data structure used to process each tile of an image), the number of memory (random access memory) accesses, etc. Such measurement can be performed merely based on the configuration of the system and examination of the page description language specifying the image to be generated.

Therefore, the present invention enables images to be generated quickly as one of many suitable image generation approaches may be used to generate the image.

The present invention is particularly suited for systems providing high computation power in combination with special architecture for pipelined screening approach as the computation power can conveniently be used to generate images according to back-end screening when pipelined screening is not suitable to generate the images.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 5 is a diagram illustrating the use of tiles in screening.

DETAILED DESCRIPTION OF THE PREFERRED EMBODIMENTS

1. Overview and Discussion of the Invention

According to an aspect of the present invention, a system may be implemented to generate images using many raster image processing approaches. However, the system determines which of the approaches is suitable for generating the target image in a given situation, and uses the determined approach. As a suitable and potentially different rendering approach may be selected for rendering each image, the overall time to generate an image may be reduced. In one embodiment described below, a system is implemented to generate images according to the back-end screening and integrated screening, and one of the approaches is selected as is suitable for each image or portion thereof.

The invention is described with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
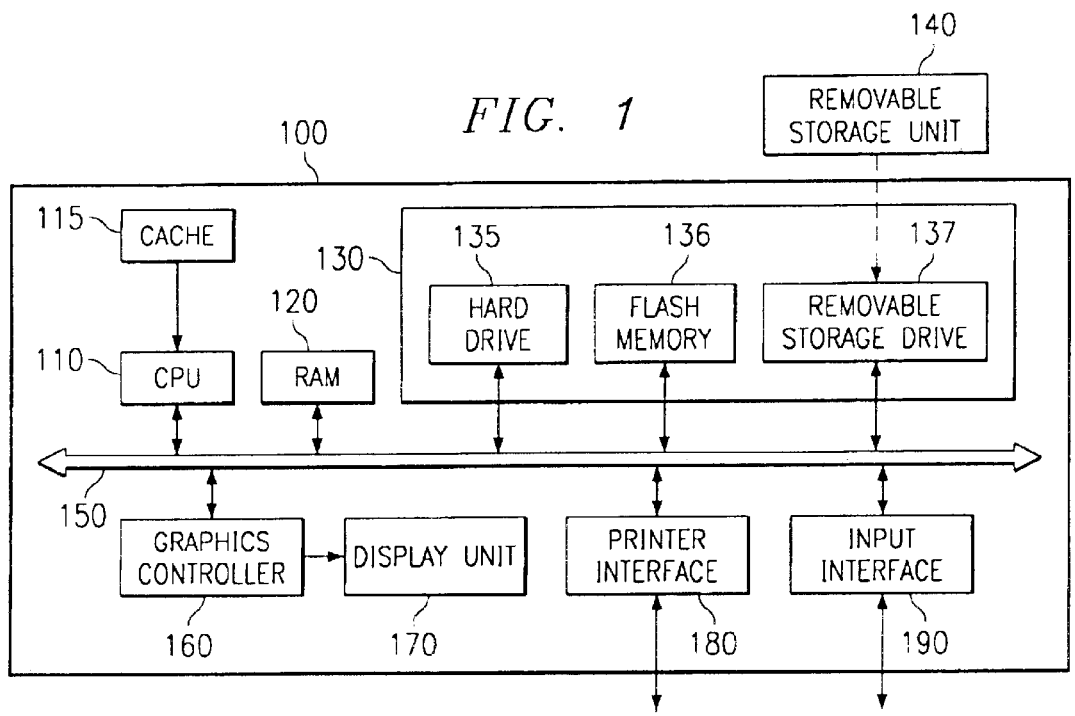
FIG. 1 is a block diagram illustrating an example system in which the present invention can be implemented.

FIG. 1 is a block diagram of computer system 100 illustrating an example environment for implementing the present invention. Even though computer system 100 is described with specific components and architecture for illustration, it should be understood that the present invention may be implemented in several other types of embodiments. For example, the invention can be implemented on multiple cooperating networked computer systems. In addition, each component can be implemented as a combination of one or more of hardware, software and firmware, even though many features of the present invention are described herein as being implemented in software.

Computer system 100 may contain one or more processors such as central processing unit (CPU) 110, cache 115, random access memory (RAM) 120, secondary memory 130, graphics controller 160, display unit 170, printer interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 (or in cache 115) to provide several features of the present invention. CPU 110 may contain multiple processing units, with each processing unit potentially being designed for a specific task. Alternatively, CPU 110 may contain only a single processing unit when such is suitable for generating an image. As described below in further detail, multiple processors may be suitable in some screening approaches (e.g., integrated screening). Unless such multiple processors are required by an approach, CPU 110 is described in a singular sense for simplicity.

RAM 120 may receive instructions from secondary memory 130 using communication path 150. Data may be stored and retrieved from secondary memory 130 during the execution of the instructions. Bit maps representing images may be generated as a result of the execution of the instruction as described below in further detail. The images may be reproduced either on a printer (not shown) or display unit 170.

Cache 115 is used to store and to provide faster access to data and instructions used by CPU 110 as is well known in the relevant arts. In general, an attempt is made to store data/instructions which are likely to be accessed by CPU 110, and if the CPU 110 successfully finds the desired data/instructions ("hit"), the access is faster than having to access the data in RAM 120. On the other hand if there is a miss when CPU 110 tries to access cache 115, then there is a performance degradation due to the slower access to RAM 120. Cache 115 may be integrated with CPU 110 into one integrated circuit for superior performance.

Graphics controller 160 generates display signals (e.g., in RGB format) to display unit 170 based on data/instructions received from CPU 110. Display unit 170 contains a display screen to display the images defined by the display signals. Input interface 190 may correspond to a key-board and/or mouse, and generally enables a user to provide inputs.

Printer interface 180 receives bit maps from CPU 110, and interfaces with printers which print images corresponding to the received bit maps. In an embodiment, printer interface 180 contains internal buffers to store the bit maps to be able to operate with printers operating at slower speeds and without internal buffers.

Secondary memory 130 may contain hard drive 135, flash memory 136 and removable storage drive 137. Flash memory 136 (and/or hard drive 135) may store the software instructions and data, which enable computer system 100 to provide several features in accordance with the present invention. The data may contain images described in conventions such as page description language (PDL) well known in the relevant arts, and the software may implement the logic to generate images consistent with the convention. Some or all of the data and instructions may be provided on removable storage unit 140, and the data and instructions may be read and provided by removable storage drive 13 7 to CPU 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer usable storage medium having stored therein computer software and/or data. An embodiment of the present invention is implemented using software running (that is, executing) in computer system 100. In this document, the term "computer program product" is used to generally refer to removable storage unit 140 or hard disk installed in hard drive 135. These computer program products are means for providing software to computer system 100.

As noted above, images to be reproduced (including specification of objects and pages forming images) may be specified in page description language (PDL), and stored in secondary memory 130 (or provided from external sources using a network interface or other suitable form of communication). Software defining how the PDL specification is to be processed may also be stored in secondary memory 130 or other non-volatile memories (e.g., a read only memory, not shown). CPU 110 may retrieve the software instructions, and execute the instructions to provide various features of the present invention as described below in further detail.

3. Method

Figure 2:
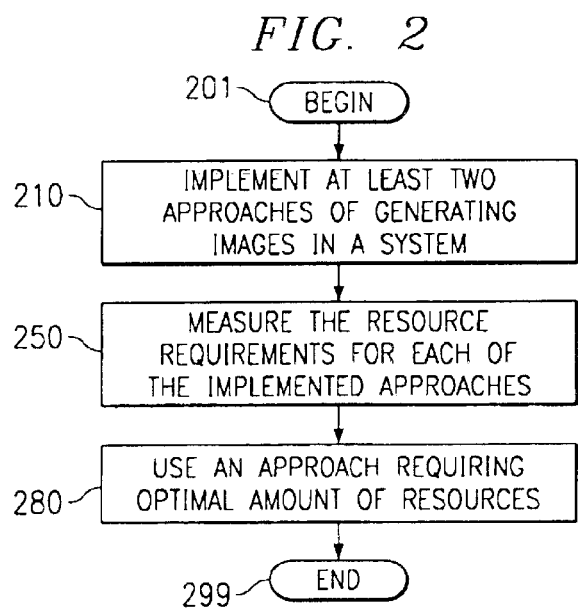
FIG. 2 is a flow chart illustrating a method in accordance with the present invention.

FIG. 2 is a flow chart illustrating a method in accordance with the present invention. The method is described with reference to FIG. 1 for illustration. The method begins in step 201 in which control immediately passes to step 210. In step 210, computer system 100 is implemented to operate to use any of multiple raster image processing approaches. Two approaches (pipeline approach and back-end screening) are described below in greater detail for illustration.

In step 250, the resources required for generating a page (image) are measured for each of the approaches of step 210. An example approach of measuring the resources is also described below in further detail. In step 280, an approach requiring an optimal amount of resources (e.g., minimum time) is selected. In the embodiments described below, an entire page is described as being rendered using the selected approach. However, the selection may be performed for each band (i.e., many adjacent horizontal lines) or sub-band (e.g., a rectangle) without departing from the scope and spirit of the present invention. The method ends at step 299.

The implementation of the method of FIG. 2 is described below with reference to an example in which a page is rendered using either back-end screening approach or integrated screening. It is helpful to first understand the two approaches in further detail.

4. Back-end Screening

Figure 3:
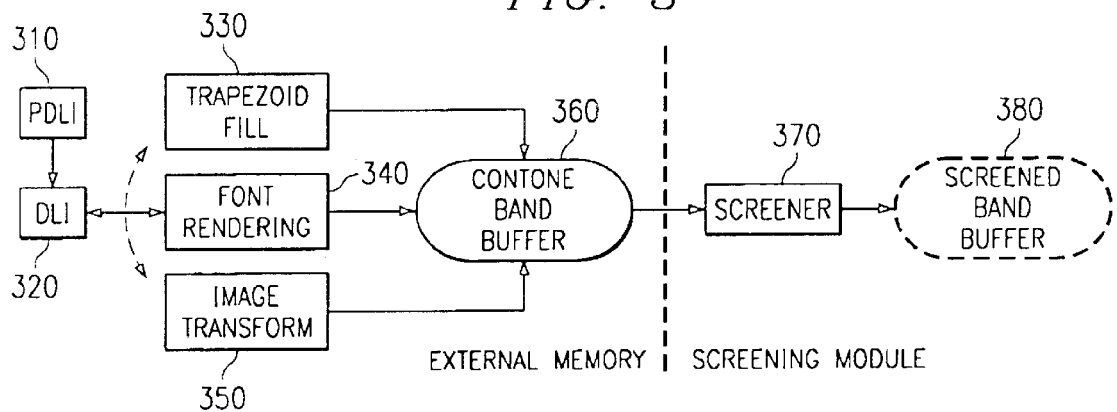
FIG. 3 is a diagram illustrating back-end screening in further detail.

FIG. 3 is a block diagram illustrating the manner in which images are generated according to the back-end screening architecture (or approach). The input to the back-end screening architecture is a specification specifying an image to be reproduced. The specification may be in the form of page description language (PDL) (e.g., Postscript) well known in the relevant arts. PDL interpreter 310 may process the page specification to generate a display list. PDL interpreter 310 may be implemented in the form of software instructions in a known way.

Display list interpreter (DLI) 320 may be implemented in the form of software instructions executed by CPU 110. DLI 320 receives the display list and determines which one of the modules 330, 340, or 350 needs to process each element of the display list depending on the specific object type of the element.

Trapezoid fill module 330, font rendering module 340, and image transform module 350 respectively render the trapezoid, font and image/graphics primitives (each primitive being an element of the display list), which are well known in the relevant arts. The rendering is performed to generate contone band data. The contone data may represent an entire image to be reproduced on an output device. Accordingly, each of the modules 330, 340, and 350 may receive both object definitions and the manner in which the objects are to be displayed in the entire image, and generate contone data accordingly.

Contone band buffer 360 may be implemented using RAM 120 to minimize the time to store and retrieve the contone data. In one embodiment contone data is represented by 8 bits per pixel per plane with each plan potentially containing a number of pixels in the order of tens of millions assuming a page size of A4. Accordingly, contone band buffer 360 may consume a large amount of memory in RAM 120. In general, the contone data is in a device independent format, and requires further processing before it can be sent to any specific device.

Screener 370 converts the contone data to a format suitable for the corresponding output device. Screener 370 may be implemented in the form of software made available from secondary memory 130. The image data in a form suitable for reproduction on an output device is stored in screened band buffer 380. Screened band buffer 380 may be present in printer interface 180. Thus, the images specified by the display list are reproduced on the corresponding output device. The description is continued with reference to integrated screening.

5. Integrated Screening

Figure 4:
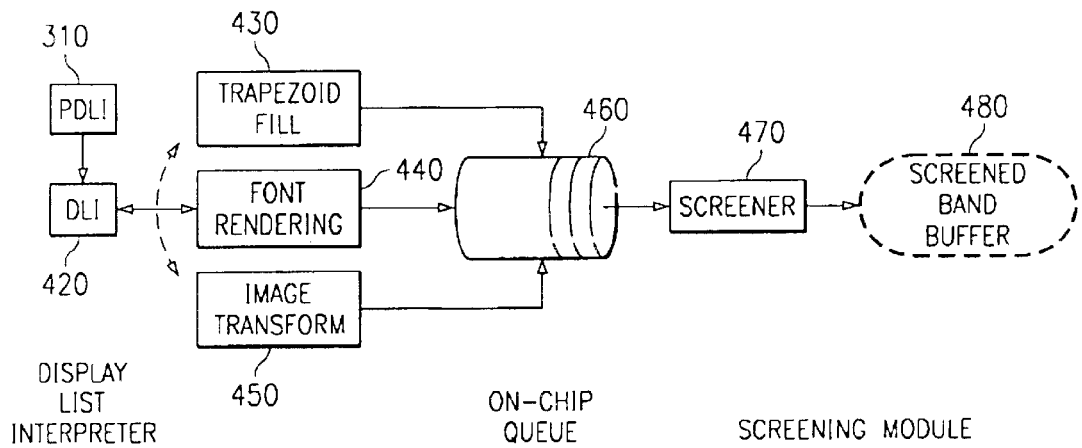
FIG. 4 is a diagram illustrating pipeline (integrated) screening in further detail.

FIG. 4 is a block diagram illustrating the manner in which images are generated according to integrated screening approach. In this approach, it is assumed that CPU 110 contains at least two processing units, one for rendering and another for screening. However, it should be understood that the present invention can be practiced even with a single processor implementing both screening and rendering. The selection criteria among the screening approach will need to reflect the corresponding implementation.

In general, the selection of appropriate screening approach may need to be determined consistent with the overhead determine in such different environments. Many such approaches will be apparent to one skilled in the relevant arts based on the disclosure provided herein, and such other approaches are contemplated to be within the scope and spirit of the present invention.

PDL interpreter (DLI) 310 generates a display list based on a PDL specification. Display list interface 420 schedules different modules 430, 440 and 450 depending on a type of object to be processed. Trapezoid fill module 430, font rendering module 440, and image transform module 450 respectively process objects related to a trapezoid, a font, and graphics/image types, to generate an image corresponding to each object specified DLI 420. The three modules may be implemented in the form of software which is executed by a first one of processing units present in CPU 110. Each of the modules generates a stream of data, and the portion of data generated is immediately stored in queue 460 consistent with a pipeline architecture. The generated data is also in a device independent format.

Queue 460 may be implemented as a smaller memory than RAM 120, and may be implemented between the first processing unit (noted above) and a second processing unit (described below). In an embodiment, queue 460 contains 8 Kbytes of memory while RAM 120 contains memory of the order of many mega bytes. As noted above, queue 460 stores portions of data generated by the three modules 430, 440, and 450. That is, the data corresponding to each object is stored as the data becomes available when processed.

Screener 470 receives portions of data from queue 460 and the image layout from display list received from PDL interpreter 310, and generates data representing an image for reproduction. The generated data is device dependent and stored in screened band buffer 480. The data in screened band buffer 480 may be sent to the corresponding device for reproduction of the image specified by the display list. Screener 470 may be implemented as software instructions which are executed in a second processing unit contained within CPU 110.

It should be understood that modules 430, 440 and 450 operate without the information of the eventual image layout. Thus, if multiple objects are overlapping, the points corresponding to the overlap may be generated multiple times by modules 430, 440 and 450. Such inefficiencies could lead to lower rates at which the images are generated, compared to the back-end screening approach of FIG. 3. The general considerations in determining the desired one of the two approaches are described first.

6. General Considerations in the Selection of the Screening Approach

As noted above, one of several possible screening approaches may be selected according to an aspect of the present invention. In one embodiment, an approach, which generates images in the minimal amount of time, may be sought to be determined and the determined approach may be used to generate the images. In comparing the throughput performance of the back-end and pipelined screening approaches, the following four variables may be considered:

1. Data Transfer;
2. Number of pixels screened;
3. Code size; and
4. Screening Tile Size.

The manner in which each of the four variables may be measured for the two screening approaches, and the manner in which one of the two approaches may be selected is described below.

7. Data Transfer

In the case of back-end screening, the image generation in a form suitable for reproduction is performed in two phases. In the first phase, contone data is generated and stored potentially in RAM 120. In the second phase, the data is read from RAM 120 to perform the screening operation. The screened data is sent to the interface (e.g., graphics controller 160 or printer interface 190) for reproduction on the corresponding output device.

In the case of pipeline screening, the intermediate contone data may be designed to remain in queue 460 (e.g., implemented between two processing units contained in CPU 110). Thus, back-end screening approach requires additional data transfer of the whole contone data. The additional time required for back-end screening ($T_d$) may be approximated as:

$$T_d = (\text{Pagesize} \times DPSI) \times 2/(\text{Transfer-rate}) \quad \text{(Equation 1)}$$

wherein Pagesize represents the area of the page (e.g., for A4 page approximately 8.2 inches×116 inches); DPSI represents the dots per square inch (e.g., for image resolution of 600 dots per inch, DPSI equals 360000); 'x' and '/' respectively representing multiplication and division operations; and transfer-rate represents the data transfer rate from/to RAM 120.

A factor of 2 is used since contone buffer data is transferred to RAM 120 after rendering. The same data is brought back to cache 115 for screening from RAM 120. It may be noted that the term Td is a constant value dependent on paper size and may not vary with content of the page.

8. Number of Pixels Screened

The pipeline screening approach screens the contone image of every display object before storing in queue 460. Thus pixels in an object may be overwriting the pixels of another object. The back-end screening approaches screens only the final contone image. Accordingly, the number of pixels screened in the pipeline approach depends on the total number of pixels intersected by each display list element. The number pixels screened in back-end screening is constant and depends on page size.

It may thus be understood that the time taken for screening by the pipeline screening approach is directly proportional to the number pixels defined by display list. The time to screen for the back-end screening is constant. The number of pixels screened by the pipeline screening approach can be approximated by the summation of areas of each display list element.

To further simplify the comparison task, one can use area of a bounding box (usually rectangle covering the area covered by an object) to estimate total area. The difference in performance of pipeline screening approach and back-end approach defined by following equation:

$$T_p = (\Sigma A_i \times DPSI \times CLK_p) - (\text{Pagesize} \times DPSI \times CLK_b) \quad \text{(Equation 2)}$$

wherein $A_i$ represents the bounding box area of $i^{th}$ display list element i in square inches; DPSI represents product of resolution in X and Y direction; Pagesize represents the area of the image; $CLK_p$ represents the average number clock cycles required to process each pixel in pipeline screening approach; and $CLK_b$ represents similar number for back-end screening.

9. Code Size

The instruction code (software instructions) size for rendering in the case of pipeline screening is typically more than the code size for back-end screening. The increase in code size for pipeline screening approaches can reduce the throughput performance due to instruction cache misses. The effect of instruction cache misses in pipeline model over back-end screening can be computed as follows:

$$Tc = (\Sigma (In \times (C_{pi} - C_{bi}))) \times CLK_{cache} \quad \text{(Equation 3)}$$

Wherein In represents the total number of element of type i in the display list; $C_{pi}$ represents the number of cache misses in one execution of render module (430, 440 or 450) for element of type i in pipeline screening model; $C_{bi}$ represents the number of cache misses in one execution of render module (330, 340 or 350) for element type i in back-end screening model; and $CLK_{cache}$ represents the number of clock cycles required to serve one cache miss.

10. Screening Tile Size

To appreciate the performance impact of tile size, it is helpful to first understand the relevance of tile in screening an image. One of the purposes of screening is to convert continuous tone images (generated by rendering) into images having tonal levels, which are suitable for reproduction on output devices. Many output devices employ dithering techniques, in which clusters of dots are used to represent tonal levels, and the human eye and brain integrate the dithered images into the impression of a continuous tone.

Figure 5:
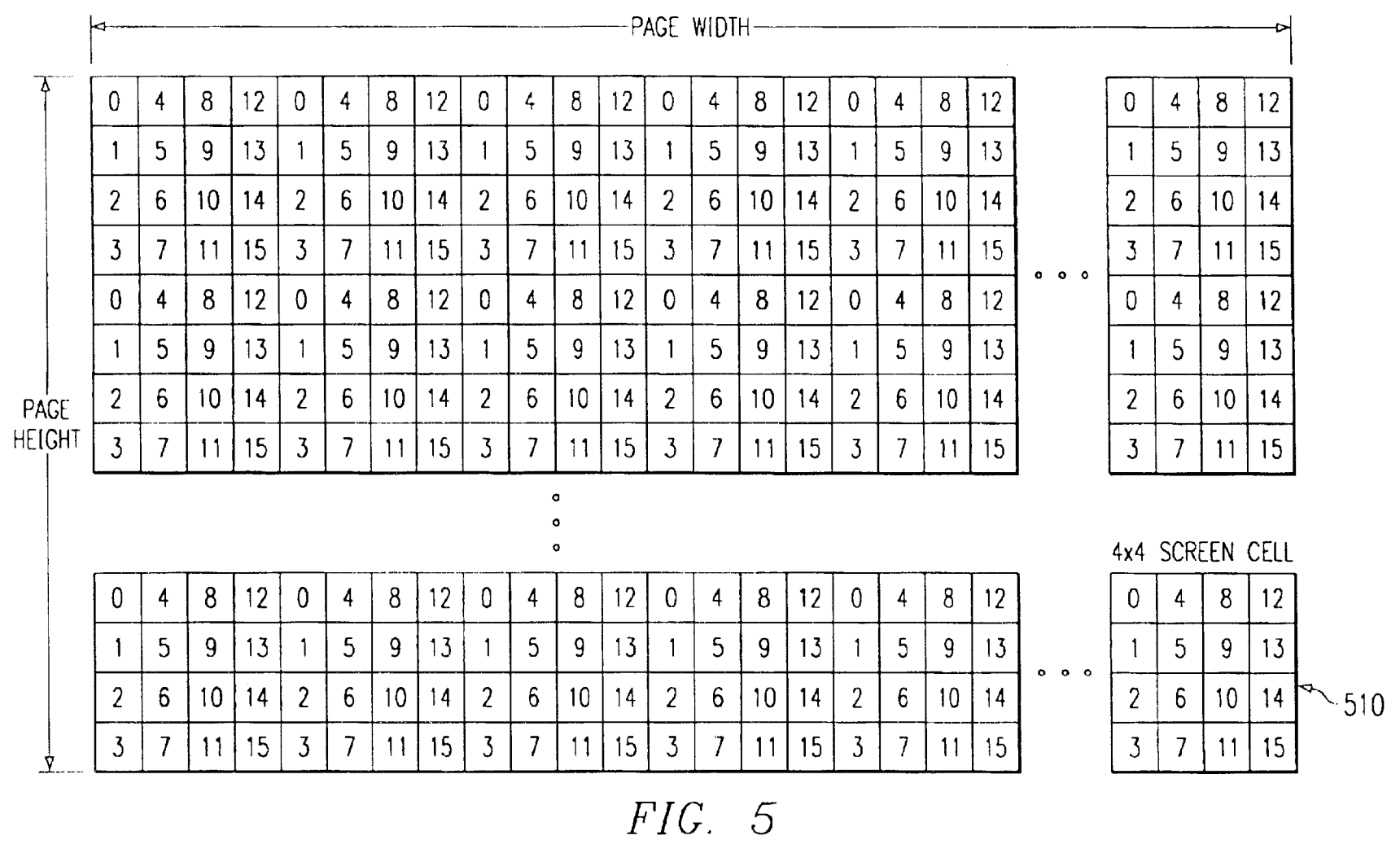

Several approaches can be employed to screen an image as is well known in the relevant arts. In one approach commonly known as lookup table (LUT) threshold screening, each image is logically viewed as containing adjacent tiles (rectangles) of a pre-determined size. A tile size of 4×4 is assumed in the illustration of FIG. 5. Thus, each tile is shown as containing cells numbered 0 through 15.

A LUT may be associated with processing each cell in the same tile position. That is, 16 LUTs may be present in the illustrative example. Thus, a pixel at position 0 is processed by using LUT number 0. The value of the pixel may be provided as an input to the corresponding LUT, and the output resulting from the lookup may represent the pixel for the screened image. All pixels of the rendered images may thus be processed to generate the screened image.

It may thus be appreciated that during pipeline screening it is important to have access to the data representing the LUTs because screener 470 does not have control over the sequence in which the pixels for an image are received. As successive horizontal lines are presented consecutively, extensive thrashing (in accessing cache 115) may result if the entire data does not fit in cache 115 in the case of pipeline screenings.

On the other hand, in the case of back-end screening, the entire image is available in contone band buffer 360, and thus screener 370 may access the lines of the tiles corresponding to the LUT(s) which can be stored in fast memories (e.g., cache 115). For example, if only one LUT fits in cache 115, screener 370 may process lines 0, 4, 8, etc., first using LUT 0, and then lines 1, 5, 9 etc., thereafter. Thus, the effect of the data structure not fitting in cache 115 is minimal in the case of back-end screening.

The number of clock cycles ($T_t$) taken in excess in the case of pipeline screening may be approximated as follows when the data structure does not fit into cache 115 and the object height is less than the screen tile height (typical case):

$$T_t = (\Sigma a_i \times DPSI) \times CLK_{tp} \quad \text{(Equation 4)}$$

wherein $a_i$ represents bounding box area of display list element i; DPSI represents the dots per square inch as described above; $CLK_{tp}$ represents the number of clock cycles to process a cache miss.

However if object height is greater than screen tile height, the effect of screen tile caching is computed as follows:

$$T_t = (\Sigma h_i \times DPSI \times T_w) \times CLK_{tp} \quad \text{(Equation 5)}$$

wherein $h_i$ represents the height of display list element i; DPSI is described above; $T_w$ represents the width of the screen; and $CLK_{tp}$ represents the average of transferring pixels from RAM 120 to cache 115.

11. Selection

Once the relevant parameters are measured, the appropriate rendering approach can be selected. With reference to the pipelined and back-end screening approaches described and measured above, the total overhead (in terms of clock cycles) difference may be computed according to the below equations 5 and 6.

$$CLK = T_d - T_p - T_c \quad \text{Equation 5}$$

$$CLK = T_d - T_p - T_c - T_t \quad \text{Equation 6}$$

The values $T_d$, $T_p$, $T_c$ and $T_t$ are computed above in Equations 1–4 respectively. Equation 5 is a when the data structure for each tile fits into cache 115, and equation 6 is applicable when the data structure does not into cache 115. The back-end screening approach is selected if the value of CLK is greater than zero, or else pipeline screening approach is selected.

Due to such selection, the throughput performance of computer system 100 in generating images is greatly enhanced, and a user may not need to wait a long amount of time for the images to be reproduced.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of generating an image using raster image processing, said image being generated based on a specification specifying said image, said specification containing data representing a plurality of objects in a page, said method comprising:

implementing a plurality of approaches, with each approach being designed to generate said image;

receiving said specification;

examining said specification to determine a number of resources required to generate said image of a page in each of said plurality of approaches;

selecting one of said plurality of approaches which requires an optimal number of resources;

generating said image of said page from said specification using said selected one of said plurality of approaches.

2. The method of claim 1, wherein:

said plurality of approaches includes rendering and screening via back-end screening and rendering and screening via pipelined screening; and said examining comprises determining a minimum duration of time consumed by either said back-end screening or said pipelined screening.

3. The method of claim 2, wherein a system implementing said method contains a random access memory (RAM) and a cache, wherein said cache enables faster access to data to a processing unit, said determining a minimum duration further comprises determining an additional time required by said back-end screening approach due to storing rendered data in said RAM.

4. The method of claim 2, wherein said determining a minimum duration further comprises determining an additional time required by said pipelined screening due to the overlap of objects contained in said specification for said image.

5. The method of claim 2, wherein a system implementing said method contains a random access memory (RAM) and a cache, wherein said cache enables faster access to data to a processing unit, wherein said determining a minimum duration further comprises determining an additional time required by said pipelined screening when said processing unit accesses a code in cache enabling implementation of said pipelined screening, and an instruction cache miss results in accessing said code in said cache.

6. The method of claim 2, wherein a system implementing said method contains a random access memory (RAM) and a cache, wherein said cache enables faster access to data to a processing unit, said determining a minimum duration further comprises determining an additional time required by said pipelined screening if a data structure for a desired tile size does not fit in said cache, wherein said data structure is used in said papelined screening.

7. The method of claim 2, wherein:

said determining a minimum duration of time consumed by either said back-end screening or said pipelined screening calculates CLK as follows:

$$CLK = T_d - T_p - T_c$$

where $T_d$ is the additional time required for back-end screening given by:

$$T_d = (\text{Pagesize} \times DPSI) \times 2/(\text{Transfer-rate})$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (\text{Pagesize} \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma (I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss.

8. The method of claim 2, wherein:
said determining a minimum duration of time consumed by either said back-end screening or said pipelined screening employing a predetermined screen tile height in screening calculates CLK as follows:

$$CLK = T_d - T_p - T_c - T_t$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;
where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;
where $T_c$ is the difference in cache misses between pipeline screening back-end screening given by:

$$T_c = (\Sigma(I_n \times (C_{pi} - C_{bi}))) \times CLR_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and
where: $T_t$ is the number of excess clock cycles between pipelined screening and back-end screening due to a screening table not being able to fit in a cache when the object height is less than the predetermined screen tile height given by:

$$T_t = (\Sigma a_i \times DPSI) \times CLK_{tp})$$

where: $a_i$ is bounding box area of display list element i; and $CLK_{tp}$ is the number of clock cycles to process a cache miss.

9. The method of claim 2, wherein:
said determining a minimum duration of time consumed by either said back-end screening or said pipelined screening employing a predetermined screen tile height in screening calculates CLK as follows:

$$CLK = T_d - T_p - T_c - T_t$$

where $T_d$ is the additional time required for back-end screening given by:

$$T_d = (Pagesize \times DPSI) \times 2/(Transfer\text{-}rate)$$

where: Pagesize is the area of the page; DPSI as the dots per square inch; and Transfer-rate is a memory data transfer rate;
where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;
where $T_c$ is the difference in cache misses between pipeline screening back-end screening given by:

$$T_c = (\Sigma(I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and
where: $T_t$ is the number of excess clock cycles between pipelined screening and back-end screening due to a screening table not being able to fit in a cache when the object height is greater than the predetermined screen tile height given by:

$$T_t = (\Sigma h_i \times DPSI \times T_w) \times CLK_{tp}$$

where: $h_i$ is the height of display list element i; $T_w$ is the width of the screen; and $CLK_{tp}$ is the number of clock cycles to process a cache miss.

10. A system for generating an image using raster image processing, said image being generated based on a specification specifying said image, said specification containing data representing a plurality of objects in a page, said system comprising:
means for implementing a plurality of approaches, with each approach being designed to generate said image;
means for receiving said specification;
means for examining said specification to determine a number of resources required to generate said image of a page in each of said plurality of approaches;
means for selecting one of said plurality of approaches which requires an optimal number of resources;
means for generating said image of said page from said specification using said selected one of said plurality of approaches.

11. The system of claim 10, wherein:
said plurality of approaches includes rendering and screening via back-end screening and rendering and screening via pipelined screening; and
said means for examining comprises means for determining a minimum duration of time consumed by either said back-end screening or said pipelined screening.

12. The system of claim 11, further comprising:
a random access memory (RAM); and
a cache, wherein said cache enables faster access to data to a processing unit; and
wherein said means for determining a minimum duration further comprises means for determining an additional time required by said back-end screening approach due to storing rendered data in said RAM.

13. The method of claim 11, wherein:
said means for determining a minimum duration further comprises means for determining an additional time required by said pipelined screening due to the overlap of objects contained in said specification for said image.

14. The method of claim 11, further comprising:
a random access memory (RAM);
a cache, wherein said cache enables faster access to data to a processing unit than said random access memory; and wherein said means for determining a minimum duration further comprises means for determining an additional time required by said pipelined screening when said processing unit accesses a code in cache enabling implementation of said pipelined screening, and an instruction cache miss results in accessing said code in said cache.

15. The method of claim 11, further comprising:

a random access memory (RAM);

a cache, wherein said cache enables faster access to data to a processing unit than said random access memory (RAM); and wherein said means for determining a minimum duration further comprises means for determining an additional time required by said pipelined screening if a data structure for a desired tile size does not fit in said cache, wherein said data structure is used in said pipelined screening.

16. The method of claim 11, wherein:

said determining a minimum duration of time consumed by either said back-end screening or said pipelined screening calculates CLK as follows:

$$CLK = T_d - T_p - T_c$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma(I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss.

17. The method of claim 11, wherein:

said determining a minimum duration of time consumed by either said back-end screening or said pipelined screening employing a predetermined screen tile height in screening caclulates CLK as follows:

$$CLK = T_d - T_p - T_c - T_t$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma(I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and where: $T_t$ is the number of excess clock cycles between pipelined screening and back-end screening due to a screening table not being able to fit in a cache when the object height is less than the predetermined screen tile height given by:

$$T_t = (\Sigma a_i \times DPSI) \times CLK_{tp})$$

where: as is bounding box area of display list element i; and $CLK_{tp}$ is the number of clock cycles to process a cache miss.

18. The method of claim 11, wherein:

said determining a minimum duration of time consumed by either said back-end screening or said pipelined screening employing a predetermined screen tile height in screening calculates CLK as follows:

$$CLK = T_d - T_p - T_c - T_t$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma(I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and where: $T_t$ is the number of excess clock cycles between pipelined screening and back-end screening due to a screening table not being able to fit in a cache when the object height is greater than the predetermined screen tile height given by:

$$T_t=(\Sigma h_i \times DPSI \times T_w) \times CLK_{tp}$$

where: $h_i$ is the height of display list element i; $T_w$ is the width of the screen; and $CLK_{tp}$ is the number of clock cycles to process a cache miss.

19. A computer program product for use with a computer system, said computer program product comprising a computer usable medium having computer readable program code means embodied in said medium generating an image using raster image processing, said image being generated based on a specification specifying said image, said specification containing data representing a plurality of objects of a page, said computer program product including:
   computer readable program code means for implementing a plurality of approaches, with each approach being designed to generate said image;
   computer readable program code means for receiving said specification;
   computer readable program code means for examining said specification to determine a number of resources required to generate said image of a page in each of said plurality of approaches;
   computer readable program code means for selecting one of said plurality of approaches which requires an optimal number of resources;
   computer readable program code means for generating said image of said page from said specification using said selected one of said plurality of approaches.

20. The computer program product of claim 19, wherein:
   said plurality of approaches includes rendering and screening via back-end screening and rendering and screening via pipelined screening; and
   said computer readable program code means for examining comprises computer readable program code means for determining a minimum duration of time consumed by either said back-end screening or said pipelined screening.

21. A method of generating an image using raster image processing, said image being generated based on a specification specifying said image, said specification containing data representing a plurality of objects in a page, said method comprising:
   implementing a plurality of approaches, with each approach being designed to generate said image;
   receiving said specification;
   examining said specification to determine a number of resources required to generate said image of a subset of a page including plural objects in each of said plurality of approaches;
   selecting one of said plurality of approaches which requires an optimal number of resources;
   generating said image of said page from said specification using said selected one of said plurality of approaches.

22. The method of claim 21, wherein:
   said subset of a page including plural objects consists of a band of a predetermined number of adjacent horizontal lines.

23. The method of claim 21, wherein:
   said subset of a page including plural objects consists of a subband of a rectangle of a predetermined number of adjacent pixels in a predetermined number of adjacent horizontal lines.

24. The method of claim 21, wherein:
   said plurality of approaches includes rendering and screening via back-end screening and rendering and screening via pipelined screening;
   said examining comprises determining a minimum duration of time consumed by either said back-end screening or said pipelined screening; and
   wherein a system implementing said method contains a random access memory (RAM) and a cache, wherein said cache enables faster access to data to a processing unit, said determining a minimum duration further comprises determining an additional time required by said back-end screening approach due to storing rendered data in said RAM.

25. The method of claim 21, wherein:
   said plurality of approaches includes rendering and screening via back-end screening and rendering and screening via pipelined screening;
   said examining comprises determining a minimum duration of time consumed by either said back-end screening or said pipelined screening; and
   wherein said determining a minimum duration further comprises determining an additional time required by said pipelined screening due to the overlap of objects contained in said specification for said image.

26. The method of claim 21, wherein:
   said plurality of approaches includes rendering and screening via back-end screening and rendering and screening via pipelined screening;
   said examining comprises determining a minimum duration of time consumed by either said back-end screening or said pipelined screening; and
   wherein a system implementing said method contains a random access memory (RAN) and a cache, wherein said cache enables faster access to data to a processing unit, wherein said determining a minimum duration further comprises determining an additional time required by said pipelined screening when said processing unit accesses a code in cache enabling implementation of said pipelined screening, and an instruction cache miss results in accessing said code in said cache.

27. The method of claim 21, wherein:
   said plurality of approaches includes rendering and screening via back-end screening and rendering and screening via pipelined screening;
   said examining comprises determining a minimum duration of time consumed by either said back-end screening or said pipelined screening; and
   wherein a system implementing said method contains a random access memory (RAM) and a cache, wherein said cache enables faster access to data to a processing unit, said determining a minimum duration further comprises determining an additional time required by said pipelined screening if a data structure for a desired tile size does not fit in said cache, wherein said data structure is used in said pipelined screening.

28. The method of claim 21, wherein:
   said determining a minimum duration of time consumed by either said back-end screening or said pipelined screening calculates CLK as follows:

$$CLK=T_d-T_p-T_c$$

where $T_d$ is the additional time required for back-end screening given by:

$$T_d=(\text{Pagesize}\times DPSI)\times 2/(\text{Transfer-rate})$$

where: Pagesize is the area of the page; DPSI is the dots per square inch; and Transfer-rate is a memory data transfer rate;

where $T_p$ is the difference in screening performance between pipeline screening and back-end screening given by:

$$T_p=(\Sigma A_i\times DPSI\times CLK_p)-(\text{Pagesize}\times DPSI\times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c=(\Sigma(I_n\times(C_{pi}-C_{bi})))\times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss.

29. The method of claim 21, wherein:
said determining a minimum duration of time consumed by either said back-end screening or said pipelined screening employing a predetermined screen tile height in screening calculates CLK as follows:

$$CLK=T_d-T_p-T_c-T_t$$

where $T_d$ is the additional time required for back-end screening given by:

$$T_d=(\text{Pagesize}\times DPSI)\times 2/(\text{Transfer-rate})$$

where: Pagesize is the area of the page; DPSI is the dots per square inch; and Transfer-rate is a memory data transfer rate;

where $T_p$ is the difference in screening performance between pipeline screening and back-end screening given by:

$$T_p=(\Sigma A_i\times DPSI\times CLK_p)-(\text{Pagesize}\times DPSI\times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c=(\Sigma(I_n\times(C_{pi}-C_{bi})))\times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and where: $T_t$ is the number of excess clock cycles between pipelined screening and back-end screening due to a screening table not being able to fit in a cache when the object height is less than the predetermined screen tile height given by:

$$T_t=(\Sigma a_i\times DPSI)\times CLK_{tp})$$

where: $a_i$ is bounding box area of display list element i; and $CLK_{tp}$ is the number of clock cycles to process a cache miss.

30. The method of claim 21, wherein:
said determining a minimum duration of time consumed by either said back-end screening or said pipelined screening employing a predetermined screen tile height in screening calculates CLK as follows:

$$CLK=T_d-T_p-T_c-T_t$$

where $T_d$ is the additional time required for back-end screening given by:

$$T_d=(\text{Pagesize}\times DPSI)\times 2/(\text{Transfer-rate})$$

where: Pagesize is the area of the page; DPSI is the dots per square inch; and Transfer-rate is a memory data transfer rate;

where $T_p$ is the difference in screening performance between pipeline screening and back-end screening given by:

$$T_p=(\Sigma A_i\times DPSI\times CLK_p)-(\text{Pagesize}\times DPSI\times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c=(\Sigma(I_n\times(C_{pi}-C_{bi})))\times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and where: $T_t$ is the number of excess clock cycles between pipelined screening and back-end screening due to a screening table not being able to fit in a cache when the object height is greater than the predetermined screen tile height given by:

$$T_t=(\Sigma h_i\times DPSI\times T_w)\times CLK_{tp}$$

where: $h_i$ is the height of display list element i; $T_w$ is the width of the screen; and $CLK_{tp}$ is the number of clock cycles to process a cache miss.

31. A system for generating an image using raster image processing, said image being generated based on a specification specifying said image, said specification containing data representing a plurality of objects in a page, said system comprising:
means for implementing a plurality of approaches, with each approach being designed to generate said image;
means for receiving said specification;
means for examining said specification to determine a number of resources required to generate said image of a subset of a page including plural objects in each of said plurality of approaches;
means for selecting one of said plurality of approaches which requires an optimal number of resources;

means for generating said image of said page from said specification using said selected one of said plurality of approaches.

32. The method of claim 31, wherein:
said subset of a page including plural objects consists of a band of a predetermined number of adjacent horizontal lines.

33. The method of claim 31, wherein:
said subset of a page including plural objects consists of a subband of a rectangle of a predetermined number of adjacent pixels in a predetermined number of adjacent horizontal lines.

34. The system of claim 31, further comprising:
a random access memory (RAM);
a cache, wherein said cache enables faster access to data to a processing unit;
wherein said plurality of approaches includes rendering and screening via back-end screening and rendering and screening via pipelined screening;
wherein said means for examining comprises means for determining a minimum duration of time consumed by either said back-end screening or said pipelined screening; and
wherein said means for determining a minimum duration further comprises means for determining an additional time required by said back-end screening approach due to storing rendered data in said RAM.

35. The method of claim 31, wherein:
said means for determining a minimum duration further comprises means for determining an additional time required by said pipelined screening due to the overlap of objects contained in said specification for said image.

36. The method of claim 31, further comprising:
a random access memory (RAM);
a cache, wherein said cache enables faster access to data to a processing unit than said random access memory; and
wherein said means for determining a minimum duration further comprises means for determining an additional time required by said pipelined screening when said processing unit accesses a code in cache enabling implementation of said pipelined screening, and an instruction cache miss results in accessing said code in said cache.

37. The method of claim 31, further comprising:
a random access memory (RAM);
a cache, wherein said cache enables faster access to data to
a processing unit than said random access memory (RAM); and
wherein said means for determining a minimum duration further comprises means for determining an additional time required by said pipelined screening if a data structure for a desired tile size does not fit in said cache, wherein said data structure is used in said pipelined screening.

38. The method of claim 31, wherein:
said determining a minimum duration of time consumed by either said back-end screening or said pipelined screening calculates CLK as follows:

$$CLK = T_d - T_p - T_c$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma (I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss.

39. The method of claim 31, wherein:
said determining a minimum duration of time consumed by either said back-end screening or said pipelined screening employing a predetermined screen tile height in screening caclulates CLK as follows:

$$CLK = T_d - T_p - T_c - T_t$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma (I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and where: $T_t$ is the number of excess clock cycles between pipelined screening and back-end screening due to a screening table not being able to fit in a cache when the object height is less than the predetermined screen tile height given by:

$$T_t = (\Sigma a_i \times DPSI) \times CLK_{tp})$$

where: $a_i$ is bounding box area of display list element i; and $CLK_{tp}$ is the number of clock cycles to process a cache miss.

40. The method of claim 31, wherein:

said determining a minimum duration of time consumed by either said back-end screening or said pipelined screening employing a predetermined screen tile height in screening calculates CLK as follows:

$$CLK = T_d - T_p - T_c - T_t$$

where $T_d$ is the additional time required for back-end screening given by:

$$T_d = (Pagesize \times DPSI) \times 2/(Transfer\text{-}rate)$$

where: Pagesize is the area of the page; DPSI is the dots per square inch; and Transfer-rate is a memory data transfer rate;

where $T_p$ is the difference in screening performance between pipeline screening and back-end screening given by:

$$T_p = (\Sigma A_i \times DPSI \times CLK_p) - (Pagesize \times DPSI \times CLK_b)$$

where: $A_i$ is the bounding box area of $i^{th}$ display list element i in square inches; $CLK_p$ is the average number clock cycles required to process each pixel in pipeline screening; and $CLK_b$ is the average number clock cycles required to process each pixel in back-end screening;

where $T_c$ is the difference in cache misses between pipeline screening back-end screening given by:

$$T_c = (\Sigma(I_n \times (C_{pi} - C_{bi}))) \times CLK_{cache}$$

where: In is the total number of element of type i in the display list; $C_{pi}$ is the number of cache misses in one rendering for an element of type i in pipeline screening; $C_{bi}$ is the number of cache misses in one rendering for element type i in back-end screening; and $CLK_{cache}$ is the number of clock cycles required to serve one cache miss; and where: $T_t$ is the number of excess clock cycles between pipelined screening and back-end screening due to a screening table not being able to fit in a cache when the object height is greater than the predetermined screen tile height given by:

$$T_t = (\Sigma h_i \times DPSI \times T_w) \times CLK_{tp}$$

where: $h_i$ is the height of display list element i; $T_w$ is the width of the screen; and $CLK_{tp}$ is the number of clock cycles to process a cache miss.

\* \* \* \* \*